(12) United States Patent
Wilson-Jones et al.

(10) Patent No.: US 11,498,615 B2
(45) Date of Patent: Nov. 15, 2022

(54) TORQUE FEEDBACK ASSEMBLY FOR A VEHICLE STEERING COLUMN

(71) Applicant: ZF AUTOMOTIVE UK LIMITED, West Midlands (GB)

(72) Inventors: Russell Wilson-Jones, Stratford-upon-Avon (GB); Mark Anthony Wilkes, Birmingham (GB)

(73) Assignee: ZF Automotive UK Limited

(*) Notice: Subject to any disclaimer, the term of this patent is extended or adjusted under 35 U.S.C. 154(b) by 288 days.

(21) Appl. No.: 17/069,891

(22) Filed: Oct. 14, 2020

(65) Prior Publication Data
US 2021/0107560 A1   Apr. 15, 2021

(30) Foreign Application Priority Data

Oct. 14, 2019   (GB) .................................... 1914858

(51) Int. Cl.
*B62D 6/00* (2006.01)
*B62D 5/04* (2006.01)

(52) U.S. Cl.
CPC ........... *B62D 6/008* (2013.01); *B62D 5/0412* (2013.01)

(58) Field of Classification Search
CPC .......... B62D 3/12; B62D 5/005; B62D 5/006; B62D 5/0409; B62D 5/0412; B62D 6/008; F16H 1/06

USPC ........................................................ 180/443
See application file for complete search history.

(56) References Cited

U.S. PATENT DOCUMENTS

| 2019/0020492 | A1 | 1/2019 | Boutros et al. |
| 2021/0107557 | A1* | 4/2021 | Wilkes ................. B62D 5/006 |

FOREIGN PATENT DOCUMENTS

| DE | 10103667 A1 * | 8/2002 | ........ B62D 15/0235 |
| DE | 10103667 A1 | 8/2002 | |
| DE | 10343141 A1 | 4/2005 | |
| JP | 3986389 B2 * | 10/2007 | |

\* cited by examiner

*Primary Examiner* — Jacob B Meyer
*Assistant Examiner* — Felicia L. Brittman
(74) *Attorney, Agent, or Firm* — Robert James Harwood

(57) ABSTRACT

A steering torque feedback assembly for a vehicle steering column includes a housing, a first gear rotatably mounted within the housing about a first rotatable axis and being configured to rotate with, or being connected to, a vehicle steering column, first and second electric motors mounted within the housing, each having a rotatable output shaft, second and third gears rotatably mounted within the housing and engaged with the first gear, and first and second reduction gearing connecting the output of the first and second motors and a respective one of the second and third gears.

10 Claims, 3 Drawing Sheets

TORQUE FEEDBACK ASSEMBLY FOR A VEHICLE STEERING COLUMN

CROSS-REFERENCE TO RELATED APPLICATION

This application claims priority to UK Patent Application No. 1914858.4 filed Oct. 14, 2019, the disclosure of which is incorporated herein by reference in its entirety.

TECHNICAL FIELD

The present disclosure relates to torque feedback assemblies for a vehicle steering column and in particular, but not exclusively, to such assemblies for use with a steer-by-wire hand wheel actuator.

BACKGROUND

Autonomous vehicles are intended to be used primarily in an autonomous mode, in which control of the vehicle is carried out without manual intervention. However, it is desirable for autonomous vehicles to be controllable manually if necessary or desired, and for that reason, vehicle controls such as a steering wheel (typically having a "steer-by-wire" operation) must be provided.

In such steer-by-wire arrangements, a hand wheel (steering wheel) is connected to one end of a shaft whose angular displacement is measured to generate a signal which is used to control the orientation of the steering wheels of the vehicle. The arrangement is commonly also provided with an electric motor connected to the shaft in order to provide a sensation of road feel to the driver.

In such arrangements, an electric motor typically drives a worm screw engaged with a worm gear which rotates with the shaft to which the steering wheel is connected. It is desirable to take steps to bias the worm screw into engagement with the worm gear in order to reduce gear rattle which occurs when the torque and direction of the motor are reversed.

SUMMARY

The present disclosure seeks to overcome or reduce the problems associated with the prior art arrangements.

In accordance with the present disclosure, a steering torque feedback assembly for a vehicle steering column comprises: a housing; a first gear rotatably mounted within the housing about a first rotatable axis and being configured to rotate with, or being connected to, a vehicle steering column; first and second electric motors mounted within the housing, each having a rotatable output shaft; second and third gears rotatably mounted within the housing and engaged with the first gear; as well as first and second reduction gearing connecting the output of the first and second motors and a respective one of the second and third gears.

The provision of two electric motors allows the motors to be controlled in a first operational mode to apply torque in opposite directions to the output gear, which eliminates the need to control backlash with precision components. In addition, the two motors can be controlled in a second operational mode to apply torque in the same direction to the output gear and allows the motors and gear components to be specified at half the rating of the required total system torque, thereby reducing the size and cost of the assembly.

The reduction gearing between the output of each of the motors and the output gear also reduces stress on the components of the gear train, which allows the gears to be constructed from plastics material rather than from metal, which reduces both the cost and the weight of the assembly. Preferably, the output shafts of the first and second electric motors are aligned parallel to the rotational axis of the first gear. In a preferred embodiment, the first and second reduction gearing comprises an epicyclic gear train.

In one embodiment, the output shafts of the first and second motors are configured to rotate a sun gear of a respective epicyclic gear train. The second and third gears may be connected to a carrier of a respective epicyclic gear train. Preferably, the first gear comprises an internal keyway. An internal keyway in the first gear allows a steering column to be connected to, and to rotate with, the output gear, whilst permitting longitudinal movement of the steering column when desired. Preferably, the first gear comprises an elongate portion in which the internal keyway is provided.

In a preferred embodiment, the first gear comprises an internally splined portion. Preferably, the housing comprises a recessed portion aligned with the internal keyway. Providing a recessed portion in the housing accommodates the inner end of a steering column as it is displaced inwardly towards its retracted, stowed position. The recessed portion preferably comprises an aperture in the housing, and the aperture preferably passes through the housing.

The present disclosure also includes a vehicle steering column comprising a steering torque feedback assembly in accordance with the present disclosure.

BRIEF DESCRIPTION OF THE DRAWINGS

By way of example only, a specific embodiment of the present disclosure will now be described with reference to the accompanying drawings, in which.

DETAILED DESCRIPTION

Figure 1:
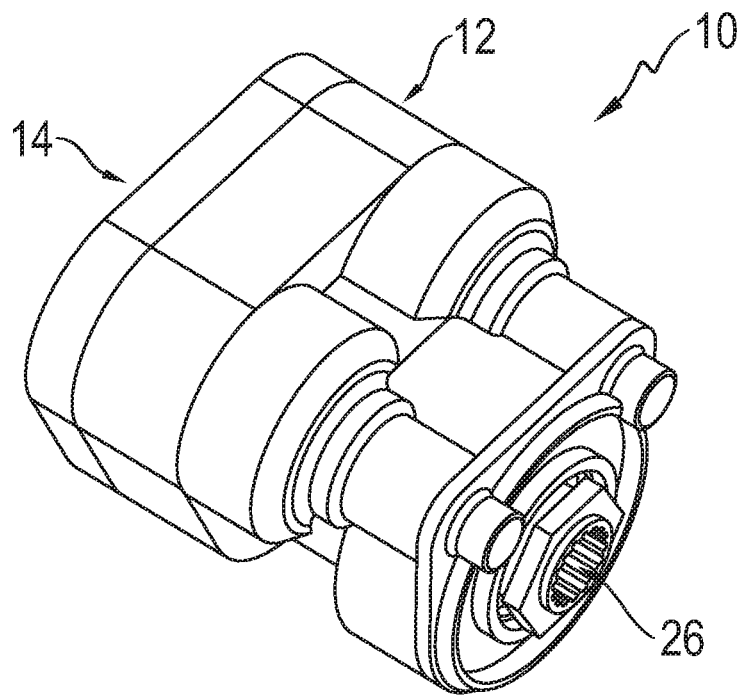
FIG. 1 is a front perspective view of an embodiment of steering torque feedback assembly in accordance with the present disclosure.

A steering torque feedback assembly 10 comprises a housing 12 having a rear portion 14 which is generally triangular with rounded corners. Mounted within the housing are two identical spaced-apart electric torque feedback motors 18, 20, each of which drives a respective output shaft 22, 24 arranged parallel to each other. As will be explained, the electric motors 18, 20 are configured to apply torque to an internally splined elongate output gear 26 which, in use, is connected to a correspondingly splined end of a steer-by-wire steering column (not shown) of a vehicle. A steering wheel is connected to the opposite end of the steering column and the angular displacement of the steering column is measured to generate a signal which is used to control the orientation of the steered wheels of the vehicle.

By applying a torque to the output gear 26 by means of an electric motor 18, 20, a sensation of road feel is provided to the driver through the steering column and steering wheel. The provision of two electric motors allows them to be controlled in a first operational mode to apply torque in opposite directions to the output gear 26, which eliminates the need to control backlash with precision components. In addition, the two motors can be controlled in a second operational mode to apply torque in the same direction to the output gear 26 and allows the motors and gear components to be specified at half the rating of the required total system torque, thereby reducing the size and cost of the assembly.

The output shafts 22, 24 of the motors 18, 20 are connected via a respective epicyclic reduction gear set E1, E2 to a respective spur gear 30, 32, each of which is in engagement with a spur gear portion 34 extending from the exterior of the output gear 26, whereby each of the motors 18, 20 can apply a torque to the output gear 26 and thereby to the steering column which is normally constrained to rotate with the output gear 26.

The output shaft 22, 24 of each of the motors 18, 20 is supported on a respective main bearing 36, 38 mounted on the housing. The rear end of each of the motor output shaft 22, 24 is also received in a further bearing 40, 42 and the front end of each of the output shaft 22, 24 is supported by a bearing 44, 46 mounted in a carrier C1, C2 of the respective epicyclic reduction gear set E1, E2. Between the respective main bearing 36, 38 and the respective bearing 44, 46 in the epicyclic gear set carrier C1, C2, the motor output shafts 22, 24 are formed into a sun gear S1, S2 of the respective epicyclic reduction gear set E1, E2. Each of the sun gears S1, S2 meshes with three identical planetary gears P1, P2 rotatably mounted on a respective one of the carriers C1, C2 and each of the planetary gears P1, P2 also meshes with a respective stationary ring gear R1, R2 mounted within the housing.

Each of the carriers C1, C2 is connected to a respective shaft 50, 52 which is rotatably mounted within the housing 12 by means of spaced apart bearings 54, 56; 58, 60 and each of carries a respective one of the two spur gears 30, 32 which are in engagement with the spur gear portion 34 of the output gear 26 as mentioned previously.

Each of the epicyclic reduction gear sets E1, E2 has a 5:1 reduction ratio and in turn there is a further 5:1 reduction ratio between each of the spur gears 30, 32 and the spur gear portion 34 of the output gear 26, resulting in an overall reduction ratio of 25:1 between the output of each of the motors 18, 20 and the output gear 26.

Figure 2:
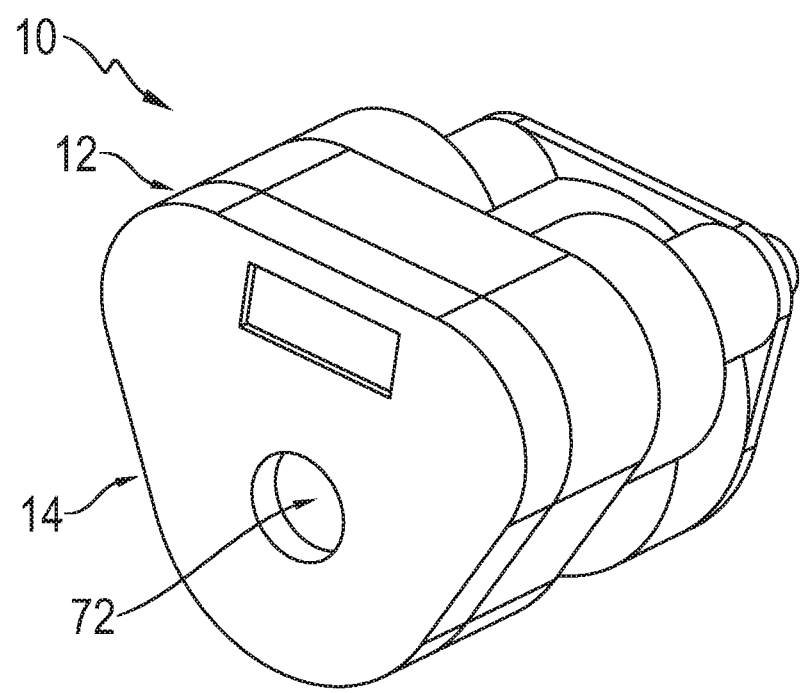
FIG. 2 is a rear perspective view of the steering torque feedback assembly of FIG. 1.
Figure 3:
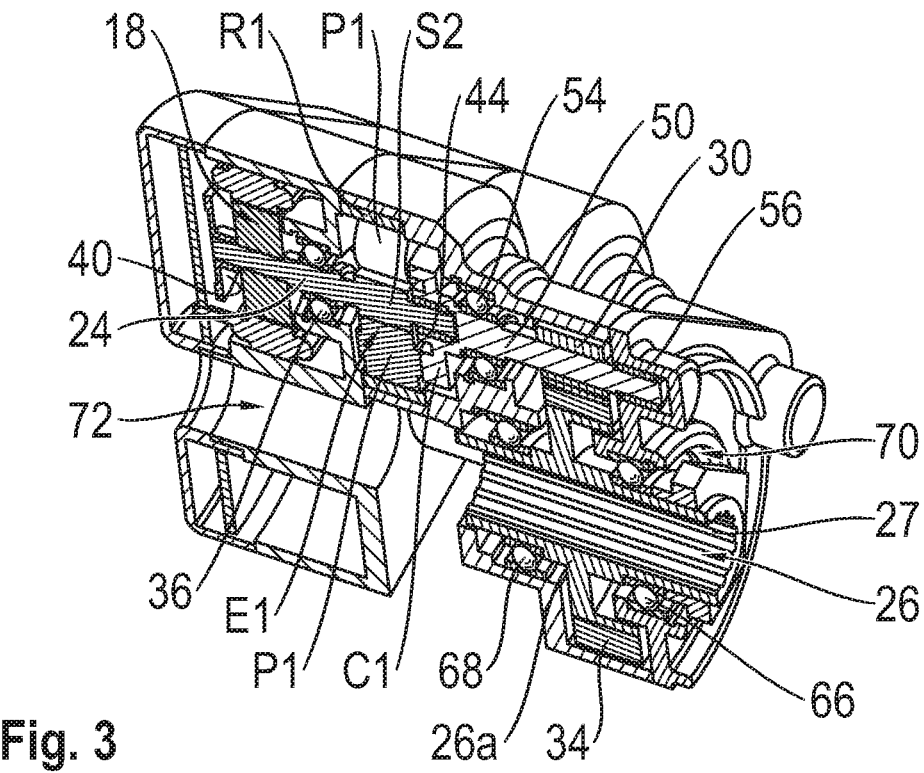
FIG. 3 is a front perspective view in vertical cross-section through the steering torque feedback assembly of FIG. 1.
Figure 4:
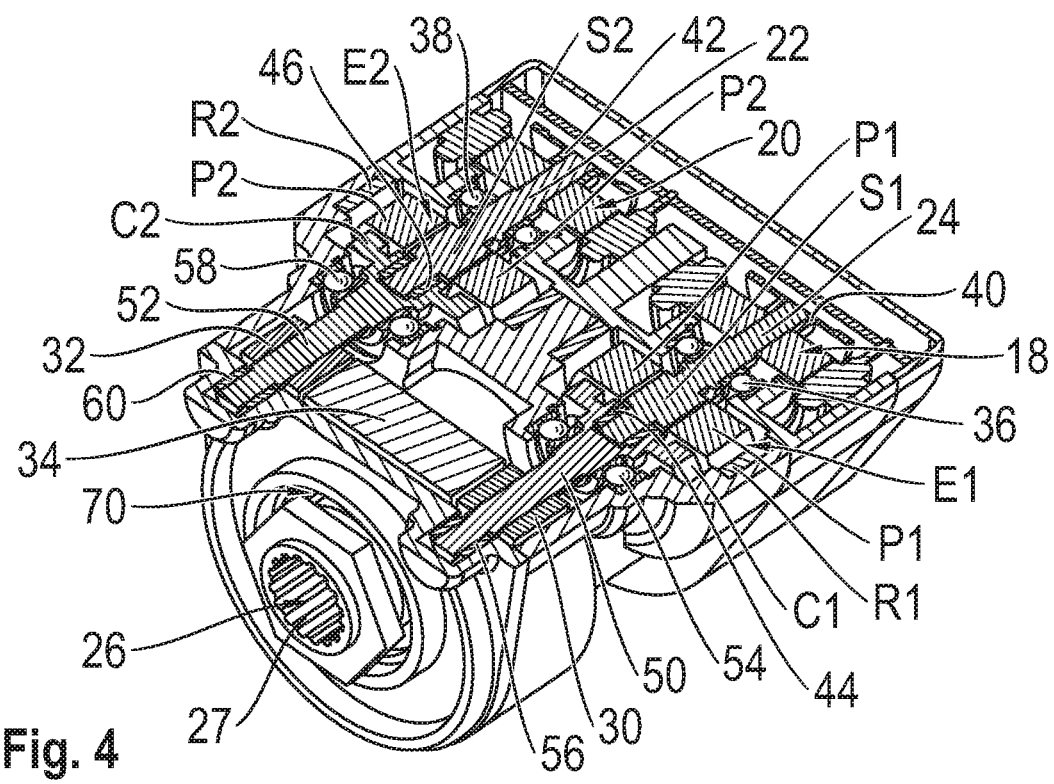
FIG. 4 is a horizontal cross-section through the steering torque feedback assembly of FIG. 1, looking in the direction of arrows IV-IV.
Figure 5:
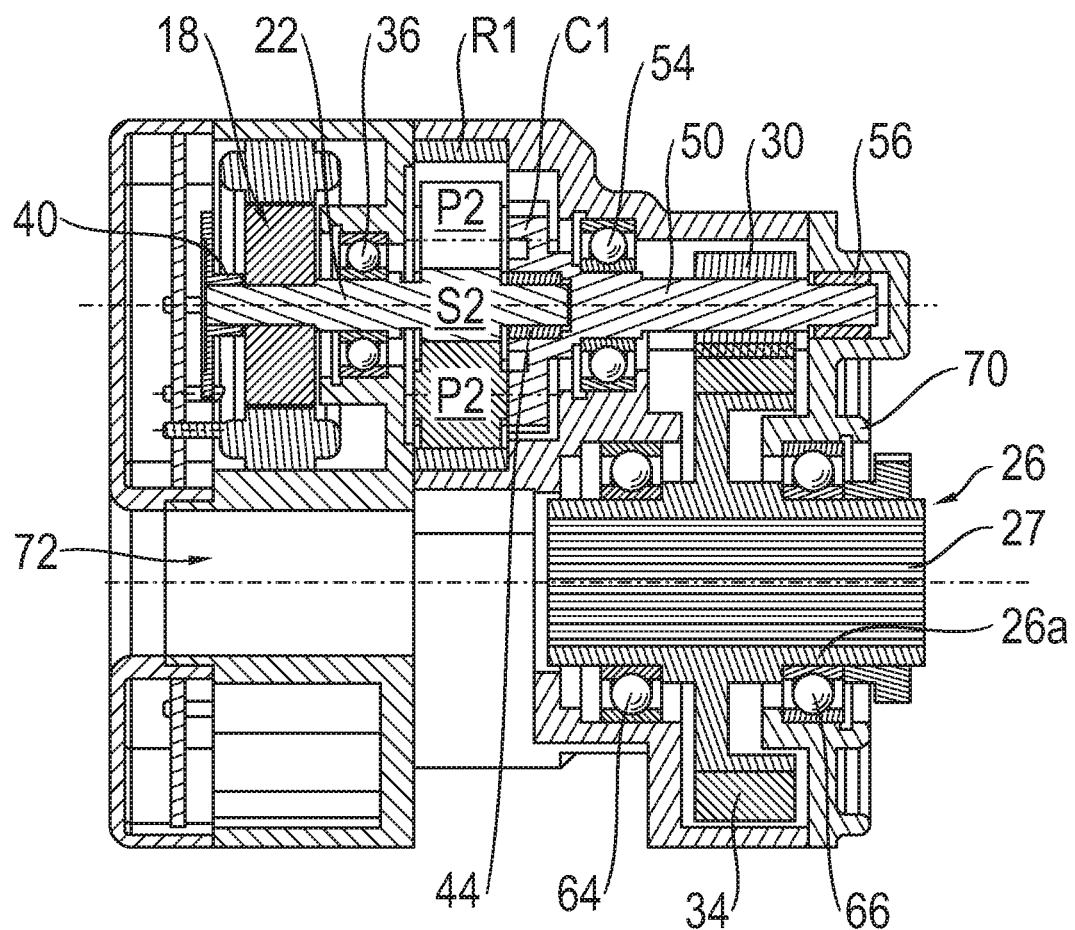
FIG. 5 is a vertical cross-sectional side view of the steering torque feedback assembly of FIG. 1.

As best seen in FIGS. 2 to 5, the output gear 26 is mounted in the housing by means of spaced-apart bearings 66, 68 and projects partially out of the housing through an aperture 70 at the front end of the housing. The output gear 26 comprises a main elongate body portion 26a which is internally splined as shown at 27 and which, in use, receives a complementarily-splined end portion of a steering column (not shown). By providing a splined connection, the position of the steering column can be adjusted between an extended position in a steer-by-wire mode and a retracted, non-operational position in an autonomous mode. It will also be observed that the rear portion of the housing 12 comprises a through passage 72 aligned with the elongate body portion 26a of the output gear 26, to allow for movement of the steering column in its retracted, non-operational position.

As explained previously, the outer surface of the main elongate body portion 26a of the output gear 26 is formed into a spur gear 34 which engages with the two spur gears 30, 32.

In use, a splined portion at one end of a steering column (not shown) is positioned in the complementarily-splined elongate body portion 26a of the output gear 26 and a steering wheel (not shown) is connected to the opposite end of the steering column. In the extended position of the steering column, the angular displacement of the steering wheel is measured to generate a signal which is used to control the orientation of the steered wheels of the vehicle. In this mode, the torque feedback motors 18, 20 can be controlled in a first operational mode to apply torque in opposite directions to the output gear 26, which eliminates the need to control backlash with precision components. In addition, the two motors can be controlled in a second operational mode to apply torque in the same direction to the output gear 26 and allows the motors and gear components to be specified at half the rating of the required total system torque, thereby reducing the size and cost of the assembly.

As explained previously, there is an overall reduction ratio of 25:1 between the output of each of the motors 18, 20 and the output gear 26, which allows torque to be applied to the steering column (and to the steering wheel attached to the steering column) accurately and responsively, in order to provide a sensation of road feel to a driver and to significantly reduce or eliminate backlash in the assembly. The overall reduction ratio of 25:1 between the output of each of the motors 18, 20 and the output gear 26 also reduces stress on the components of the gear train, which allows the gears to be constructed from plastics material rather than from metal, which reduces both the cost and the weight of the assembly.

In the retracted, stowed position of the steering column, when the vehicle is driven in an autonomous mode, the motors 18, 20 are not actuated, since there is then no need to provide a sensation of road feel to the steering wheel. However, the provision of the through passage 72 aligned with the elongate portion 26a of the output gear 26 accommodates the inner end of the steering column when in the retracted, stowed condition.

The disclosure is not restricted to the details of the foregoing embodiment.

What is claimed is:

1. A steering torque feedback assembly for a vehicle steering column, comprising
   a housing;
   a first gear rotatably mounted within the housing about a first rotatable axis and being configured to rotate with, or being connected to, a vehicle steering column;
   first and second electric motors mounted within the housing, each having a rotatable output shaft;
   second and third gears rotatably mounted within the housing and engaged with the first gear;
   first and second reduction gearing connecting the output of the first and second motors and a respective one of the second and third gears.

2. A steering torque feedback assembly as defined in claim 1, wherein the output shafts of the first and second electric motors are aligned parallel to the rotational axis of the first gear.

3. A steering torque feedback assembly as defined in claim 2, wherein the first and second reduction gearing comprises an epicyclic gear train.

4. A steering torque feedback assembly as defined in claim 3, wherein the output shafts of the first and second motors are configured to rotate a sun gear of a respective epicyclic gear train.

5. A steering torque feedback assembly as defined in claim 4, wherein the second and third gears are connected to a carrier of a respective epicyclic gear train.

6. A steering torque feedback assembly as defined in claim 5, wherein the first gear comprises an internal keyway.

7. A steering torque feedback assembly as defined in claim 6, wherein the first gear comprises an elongate portion in which the internal keyway is provided.

8. A steering torque feedback assembly as defined in claim 7, wherein the first gear comprises an internally splined portion.

9. A steering torque feedback assembly as defined in claim 8, wherein the housing comprises a recessed portion aligned with the internal keyway.

10. A steering torque feedback assembly as defined in claim 9, wherein the recessed portion comprises an aperture in the housing.

* * * * *